(12) United States Patent
LeMarquand et al.

(10) Patent No.: US 9,348,491 B2
(45) Date of Patent: May 24, 2016

(54) METHOD AND SYSTEM TO LAYOUT APPLICATIONS ON MULTIPLE PLATFORMS

(71) Applicant: QNX Software Systems Limited, Ottawa (CA)

(72) Inventors: Paul Wilson LeMarquand, Toronto (CA); Julian Dolce, Ottawa (CA)

(73) Assignee: 2236008 Ontario Inc., Waterloo, CA (US)

( * ) Notice: Subject to any disclaimer, the term of this patent is extended or adjusted under 35 U.S.C. 154(b) by 156 days.

(21) Appl. No.: 13/711,718

(22) Filed: Dec. 12, 2012

(65) Prior Publication Data

US 2014/0164942 A1 Jun. 12, 2014

(51) Int. Cl.
*G06F 3/048* (2013.01)
*G06F 17/00* (2006.01)
*G06F 9/445* (2006.01)
*G06F 15/17* (2006.01)
*G06F 3/0484* (2013.01)
*G06F 9/44* (2006.01)
*G06F 3/0481* (2013.01)

(52) U.S. Cl.
CPC .......... *G06F 3/0484* (2013.01); *G06F 3/04817* (2013.01); *G06F 8/38* (2013.01)

(58) Field of Classification Search
CPC ......... G06F 3/048; G06F 17/00; G06F 9/445; G06F 15/17
USPC ........................................................ 715/744
See application file for complete search history.

(56) References Cited

U.S. PATENT DOCUMENTS

| | | | | |
|---|---|---|---|---|
| 8,453,063 | B1 * | 5/2013 | Hendry ................ | G06F 3/1431 345/1.1 |
| 2003/0192040 | A1 * | 10/2003 | Vaughan ................ | G06F 8/61 717/173 |
| 2008/0134045 | A1 * | 6/2008 | Fridman ................ | G06F 8/60 715/735 |
| 2009/0228122 | A1 * | 9/2009 | Baier et al. ........... | 700/83 |
| 2010/0251231 | A1 * | 9/2010 | Coussemaeker ....... | G06F 8/61 717/176 |
| 2011/0029881 | A1 * | 2/2011 | Smith .................... | G06F 8/60 715/735 |
| 2011/0083069 | A1 * | 4/2011 | Paul et al. ............. | 715/234 |
| 2012/0166979 | A1 | 6/2012 | Lewontin | |
| 2012/0240065 | A1 | 9/2012 | Linietsky et al. | |
| 2012/0240066 | A1 | 9/2012 | Bovett et al. | |

OTHER PUBLICATIONS

W3C, Media Queries, W3C Recommendation Jun. 19, 2012 at <http://www.w3.org/TR/css3-mediaqueries/>.
Kendo UI, "Build HTML5 mobile web apps for all mobile devices with Kendo UI Mobile framework", www.kendoui.com/mobile.aspx, downloaded on Sep. 26, 2012.
Open ACS, "Forum OpenACS Improvement Proposals (TIPs): TIP #34 (Expired): Application package ui separation", http://openacs.org/forums/message-view?message_id=150132, downloaded on Sep. 26, 2012.
Office Action, Canadian Patent Application No. 2,798,394, issued Oct. 3, 2014.
Canadian Intellectual Property Office, Office Action on Application No. 2,798,394, Issued on May 29, 2015.

* cited by examiner

*Primary Examiner* — Jennifer To
*Assistant Examiner* — Hugo Molina
(74) *Attorney, Agent, or Firm* — Moffat & Co.

(57) ABSTRACT

A method and apparatus for providing applications to computing devices, where each application is provided with a user interface which is suited for the display characteristics of the computing device. The user interface data is correlated with an identifier associated to the display characteristics of the computing device. The user interface data is provided such that the same executable file may have different user interfaces.

8 Claims, 6 Drawing Sheets

METHOD AND SYSTEM TO LAYOUT APPLICATIONS ON MULTIPLE PLATFORMS

FIELD OF THE DISCLOSURE

The present disclosure relates to the provision of an application to a computing device, and in particular relates to the provision of an application to a computing device having one of a plurality of different interface capabilities.

BACKGROUND

Developers of applications for computing devices, such as smart phones, tablets or other devices, typically create multiple versions of their applications to support the different computing device platforms. In particular, different platforms have different interfaces, such as different screen sizes, different screen proportions, different screen resolution, and different input mechanisms such as touch-screens, keyboards, and buttons, among others. Each version of each application must be tailored to the specific requirement of each platform.

This process of customization is labor-intensive and error-prone, as it is customary to size and position interface components through programming code, and to compile a new executable file for each platform. As the number of platforms increases, the complexity of this problem increases, as do the possibilities for an error to escape quality-control processes.

BRIEF DESCRIPTION OF THE DRAWINGS

The present disclosure will be better understood with reference to the drawings, in which.

DETAILED DESCRIPTION OF THE DRAWINGS

The present disclosure provides a method and apparatus to provide applications to a device, the device having one of a plurality of device types. In particular, the present disclosure provides a method, at a network element, for providing applications to a device having one of a plurality of device types, the method comprising: receiving a request for an application from the device, the request including an identifier associated with the device; correlating one or more device display characteristics associated with the identifier with one of a plurality of user interface formatting specifications for the application; configuring the application with the one of the plurality of user interface formatting specifications; and sending the configured application to the device.

The present disclosure further provides an application repository server for providing applications to a device having one of a plurality of device types, the server comprising: a communications subsystem; a processor; wherein the server is configured to: receive a request for an application from a device, the request including an identifier associated with the device; correlate one or more device display characteristics associated with the identifier with one of a plurality of user interface formatting specifications for the application; configure the application with the one of the plurality of user interface formatting specifications; and send the configured application to the device.

Figure 1:
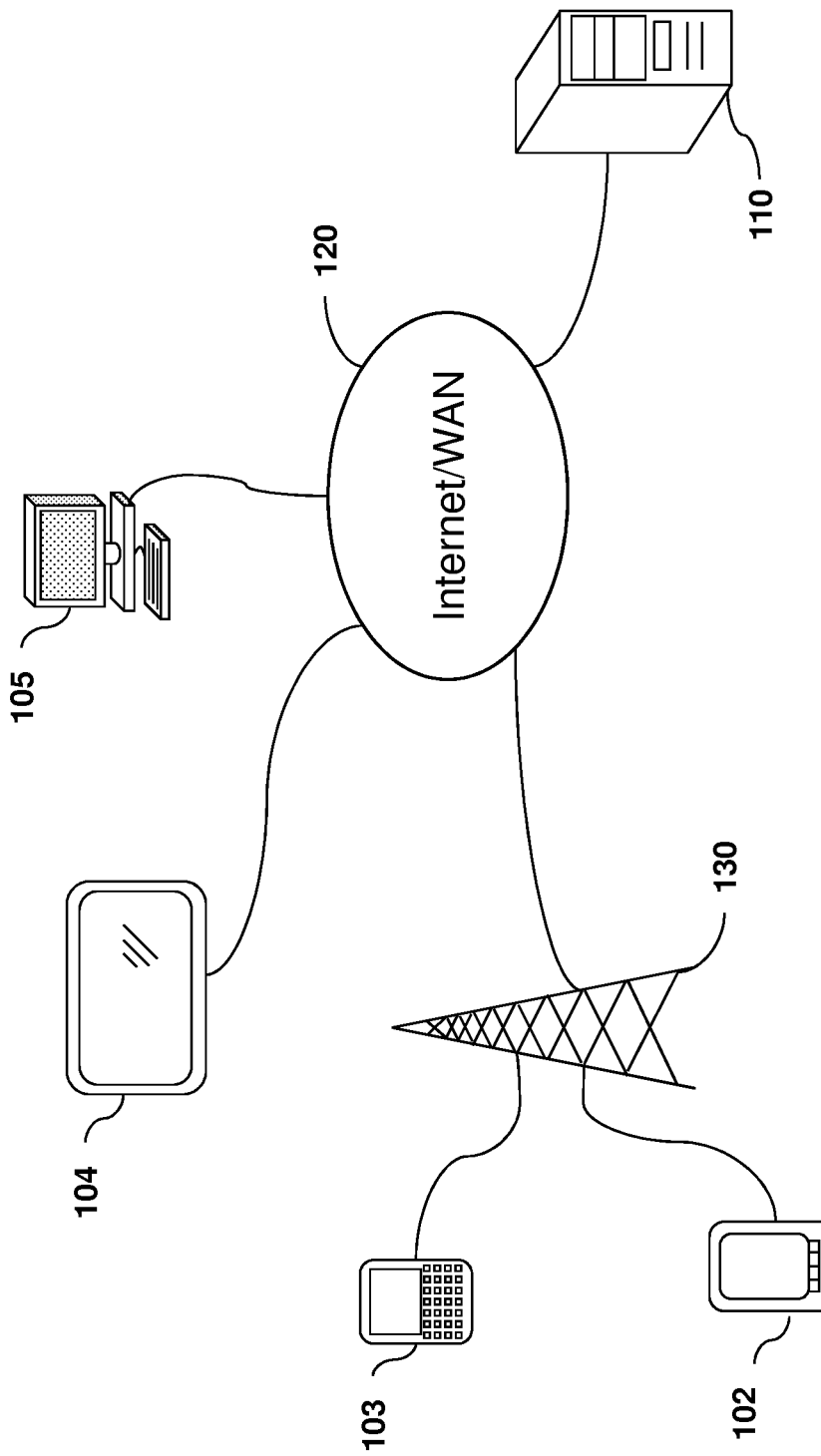
FIG. 1 is an example network environment according to at least one embodiment of the present disclosure.

Reference is made to FIG. 1 which shows an example network infrastructure in which at least one embodiment of the present disclosure may be practiced.

Computing devices 102, 103, 104, 105 are connected to the wide area network (WAN) 120. Notably, WAN 120 may be the Internet, but could be any wide area network (WAN) and the present disclosure is not so limited.

In the example of FIG. 1, computing device 102 is a mobile device with a large screen, and computing device 103 is a mobile device with a smaller screen. Both computing devices 102 and 103 are connected to the Internet through cellular network 130. However other means to connecting to the Internet are within the scope of the present disclosure.

Further, in the example of FIG. 1, computing device 104 is a tablet device, and computing device 105 is a desktop computer. Both computing devices 104 and 105 are either connected to the WAN 120 directly, for example through a local area network (LAN), or through an access point in a wireless LAN (WLAN), such as a WiFi™ network.

Application repository server 110 is also connected to the WAN 120, and may communicate with any of computing devices 102, 103, 104, and 105. Application repository server 110 holds multiple applications, which computing devices 102, 103, 104, and 105 may download upon request. In some embodiments, the functionality of application repository server 110 may be distributed over multiple network elements, and the present disclosure does not limit the application repository server to a single network element.

The downloading of an application from application repository server 110 may further include authentication or identity verification, and may or may not require payment for the application. The embodiments of the present disclosure could be used with any payment and authentication procedures.

In accordance with one aspect of the present disclosure, each of computing devices 102, 103, 104 and 105 have different interface capabilities. For example, each of these computing devices may differ in terms of screen size, screen proportions (i.e., the ratio of length and width), screen resolution, and input mechanisms. Therefore, for a given application, each of computing devices 102, 103, 104 and 105 may need a version of the application which is specifically tailored to its interface capabilities.

One option to support the above is to provide a separate compiled application for each interface type. However, this is burdensome for application developers, and may lead to errors or bugs.

Therefore, according to at least one embodiment of the present disclosure, the application repository server 110 holds a common executable portion of the application, which is valid for all versions of the application. The application repository server further holds a plurality of user interface formatting specifications for each version of each application. The executable portion of the application can be combined with the correct user interface formatting specification to create an application which is tailored for the interface capabilities of a specific device.

Based on this model, the complexity of application development is reduced, as application developers need only provide one compiled executable file and interface formatting specification data for each of the supported versions of the application (e.g. device type variants).

In at least one embodiment, the interface formatting specification data is provided in Cascading Style Sheet (CCS) syntax, as for example defined by the World Wide Web Consortium (W3C) CSS Work Group, "*Cascading Style Sheets (CSS) Snapshot* 2010", May 12, 2011, the contents of which are incorporated herein by reference. However, the present disclosure is not so limited, and other styles or syntax (e.g. Syntactically Awesome Stylesheets (Sass) and Sassy CSS (SCSS) by Hampton Catlin, sass-lang.com) are possible.

Thus, according to one embodiment of the present disclosure, a user interface may be defined using a renderable mark-up language such as the hyper-text mark-up language (HTML). In this case, the layout for the application may not be predefined per se, but rather dynamically determined using a layout engine, such as a Webkit, when the application runs on the target device. The formatting specifications are thus combined with the executable portion of the application and are later used by the layout engine to determine the actual layout.

The interface formatting specification may direct the layout engine to adapt the user interface definition in the application to the specific requirements or constraints of the computing device, resulting in a potentially unique interface layout for each computing device. Further, the user interface definition in the application may include other functionally executable components. These other functionally executable components may, for example, be implemented using Javascript or HTML5. The executable portion of the application thus includes both the functionally executable components and the user interface definition.

Figure 2:
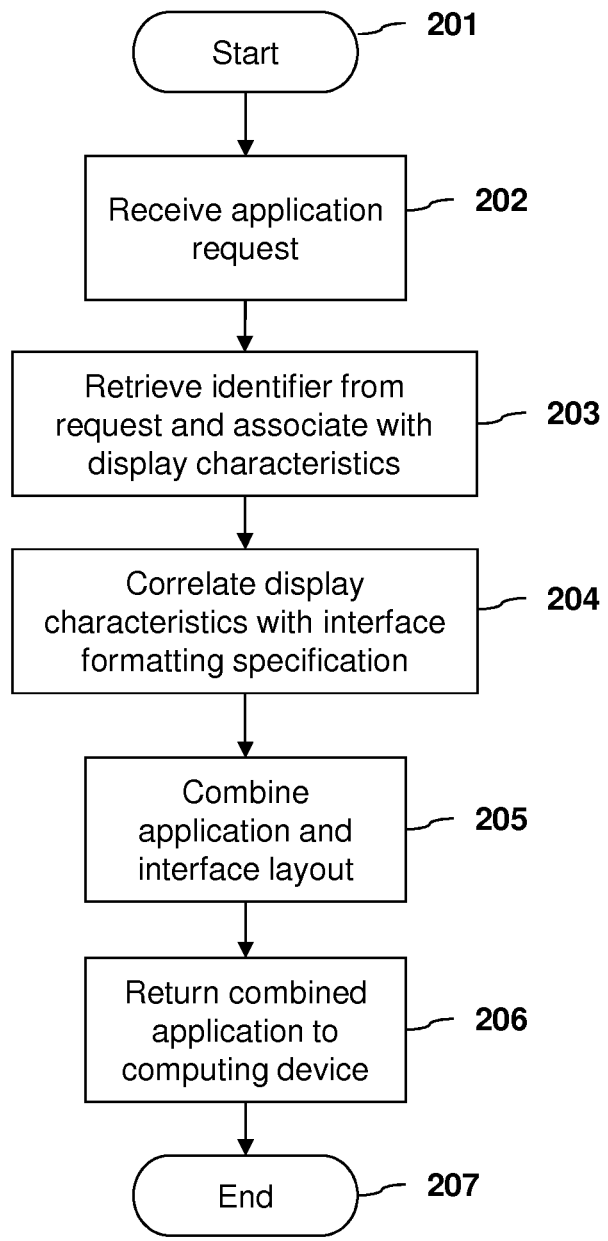
FIG. 2 is a block diagram of an example method according to at least one embodiment of the present disclosure.

Reference is now made to FIG. 2 which illustrates a process at an application repository server by which applications are provided to computing devices.

The process starts at block 201, and proceeds to block 202 in which the application repository server receives a request from a computing device for an application. The request specifies which application the computing device is trying to download. In one embodiment, the request also provides an identifier that may be used to identify a user interface formatting specification for the computing device. In an alternative embedment, the identifier may be implicit within the request. For example, if the user of the device has logged into an application store, a pre-stored profile associated with the login information may be used to identify the user interface formatting specification of the computing device, and any requests during the session may in turn provide an implicit identifier of the user interface formatting specification.

The identifier may simply identify the specific model of the device. For example, the identifier may identify a device "X". In at least one embodiment, the identifier may simply specify a screen size, like 3"×2", or a screen resolution, for example 320×240 pixels. In at least one embodiment, the identifier can directly identify a user interface formatting specification. In yet another embodiment, the identifier may include multiple identifiers, such as for example, screen size and resolution. Other possibilities as would be known by those skilled in the art are within the scope of the present disclosure.

The process next proceeds to block 203 in which the application repository server retrieves the identifier from the request and associates the identifier with a device display characteristic for the computing device. The device display characteristic may, for example, be screen size, resolution, aspect ratio, among other characteristics.

Next, at block 204, the application repository correlates the device display characteristic with a user interface formatting specification. In this respect, the application repository server maintains a table or association of device display characteristics with user interface formatting specifications.

The table of user interface formatting specifications need not provide a one-to-one relationship between device display characteristics and user interface formatting specifications. Rather, the table may allow for an arbitrary number of device display characteristics to be correlated with an arbitrary number of user interface formatting specifications, or an n-to-m relationship. Thus, in one example, a user interface table for an application may look like Table 1, shown below.

TABLE 1

| MyApp User Interface Formatting Specifications | |
| --- | --- |
| Device X | UI1 |
| Device Y | UI2 |
| screen: 3" x 2" | UI2 |
| resolution: 320 x 640 | UI1 |
| Device X | UI3 |
| resolution: 480 x 768 | UI4 |

As seen in Table 1 above, the Device X is compatible with UI1 and UI3. Similarly, UI2 is compatible with the Device Y or a screen of 3"×2".

In at least one embodiment, the entries of the table are provided in order of priority. Thus, if more than one user interface formatting specification is compatible with the device display characteristics associated with the identifier provided in the request, the first entry in the table is given preference.

If multiple identifiers are included in the request, the application repository server attempts to find a user interface formatting specification which is compatible with all device display characteristics associated with the identifiers. If no user interface formatting specification which satisfies this condition is found, an error is returned, or, in at least one embodiment, the user interface formatting specification which satisfies as many provided identifiers as possible is selected.

Once a user interface formatting specification has been selected, the application is combined with the user interface formatting specification at block 205. In at least one embodiment, the combination merely entails ensuring that the proper files are packaged along with the executable portion of the application.

The process then proceeds to block 206 in which the combined application and user interface formatting specification are returned to the requesting device. The requesting device may then install the application. The process ends at block 207.

Figure 3:
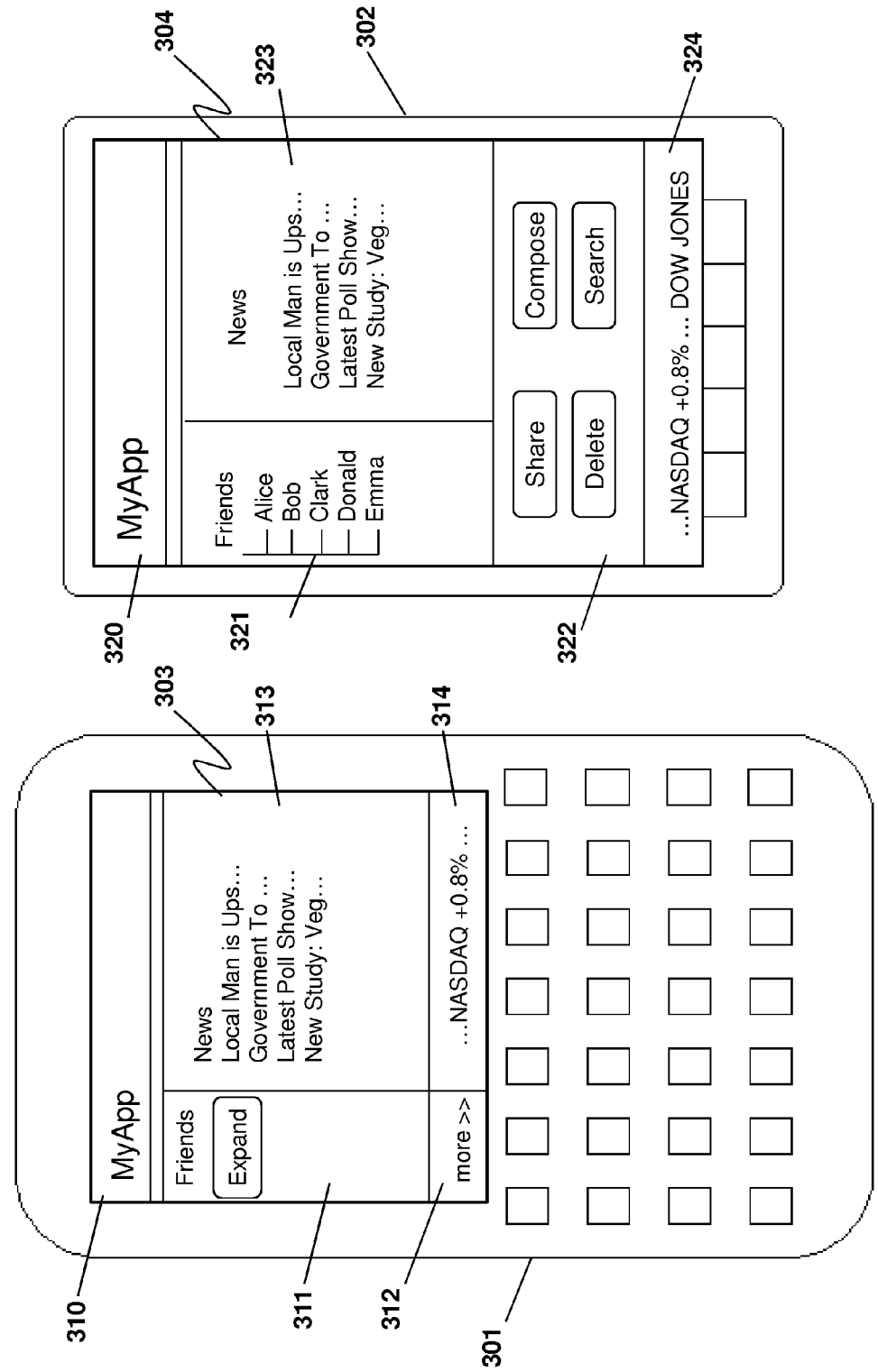
FIG. 3 is a representation of two graphical interfaces for the same application on different devices according to at least one embodiment of the present disclosure.

Reference is now made to FIG. 3, which shows a first device 301 and a second device 302. As can be seen from FIG. 3, the screen area 303 of device 301 is smaller and has different proportions than the screen area 304 of device 302.

Both devices 301 and 302 are displaying an application, called "MyApp". Notably, the same application is running the same executable portion of the application on each of devices 301 and 302. However, the graphical interface layout of each application is different, each being specifically adapted to the respective device's screen size.

Specifically, the graphical user interface layout of device 301 includes a header 310, a "Friends" tab 311, a "News" tab 313, a "more" button 312, and a ticker 314.

In the version of the application appearing on device 302, a header 320 corresponding to header 310 is also present, but is slightly larger. A "Friends" tab 321, which corresponds to the "Friends" tab 311 is also present. However, "Friends" tab 321 is not collapsed as is "Friends" tab 311. "News" tab 323 corresponds to the "News" tab 313. Ticker 324 corresponds to ticker 314.

Instead of the "more" button 312, the graphical interface layout shown on device 302 includes a button panel 322. However, pressing the "more" button 312 on device 301 may display a corresponding set of buttons as those in button panel 322 and collapse the ticker 314.

Thus the same application displays a different user interface layout depending on which device it runs on. Notably, the graphical interface of device 301 and the graphical interface of device 302 share many common features but have different user interface layouts. Although such a similarity is to be expected, it is not a requirement of the present disclosure that different graphical interfaces for the same application to have any level of similarity.

At the server, various options are possible for bundling the functional aspect of an application with a style sheet portion. In one embodiment, the bundling could occur at the server, whereby the server could provide one or more executable files with bundled style sheets.

Figure 4:
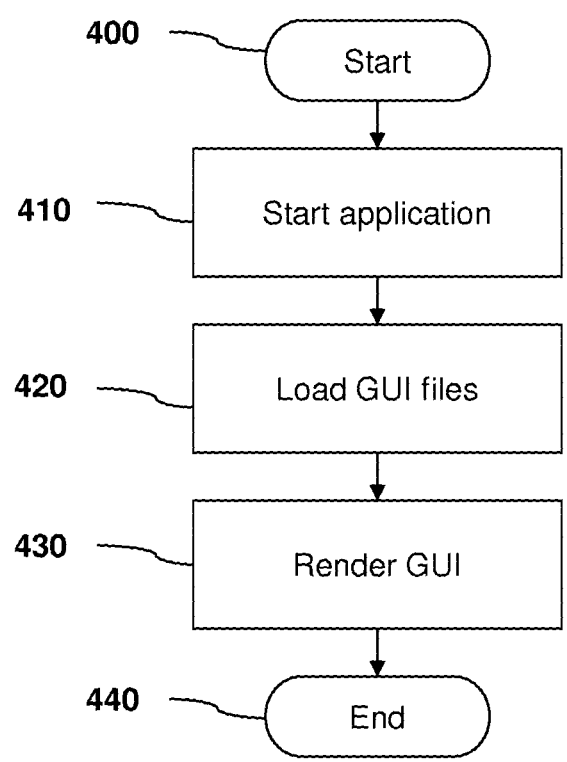
FIG. 4 is a block diagram of an example method according to at least one embodiment of the present disclosure.

In an alternative embodiment, one or more executable files and separate style sheets could be provided to a device. Because the same executable file runs on each of device 301 and 302, and the graphical user interface layout may be defined by external files, the application then correlates functionality with the interface. Reference is now made to FIG. 4.

FIG. 4 is a block diagram of a process according to at least one embodiment of the present disclosure for building a user interface. The process starts at block 400, and proceeds to block 410 in which the application is started.

The process then proceeds to block 420, in which the external files which define the user interface layout are loaded.

The contents of the external files are used to render the user interface at block 430.

For example, as indicated above, a user interface may be defined using a renderable mark-up language. In this case, the layout for the application may be dynamically determined using a layout engine at the computing device when the application runs on the target device.

The interface formatting specification may direct the layout engine to adapt the user interface definition in the application to the specific requirements or constraints of the computing device, resulting in a potentially unique interface layout for each computing device. For example, utilizing a CSS model, the layout engine may proceed through various style sheet definitions and may apply rules in the style sheets using a priority scheme to determine which style rules apply if more than one rule matches against a particular display element on the computing device.

From block 430, the process proceeds to block 440 and ends.

Therefore, based on the above disclosure, different application user interface layouts can be provided for different platforms, while providing the same executable portion of the application. Notably, some platforms may require a different one or more executable files than others, if for example a platform utilizes a different processor and/or operating system. However, even in such cases, the present disclosure allows developers to simplify the development process by providing different user interface formatting specifications externally from the compiled executable files. An application repository server can then distinguish between device display types and provide the executable with the correct user interface formatting specification (e.g. style sheet) for the particular device display type.

The application repository server may be any network element. A simplified network element is shown with regard to FIG. 5.

Figure 5:
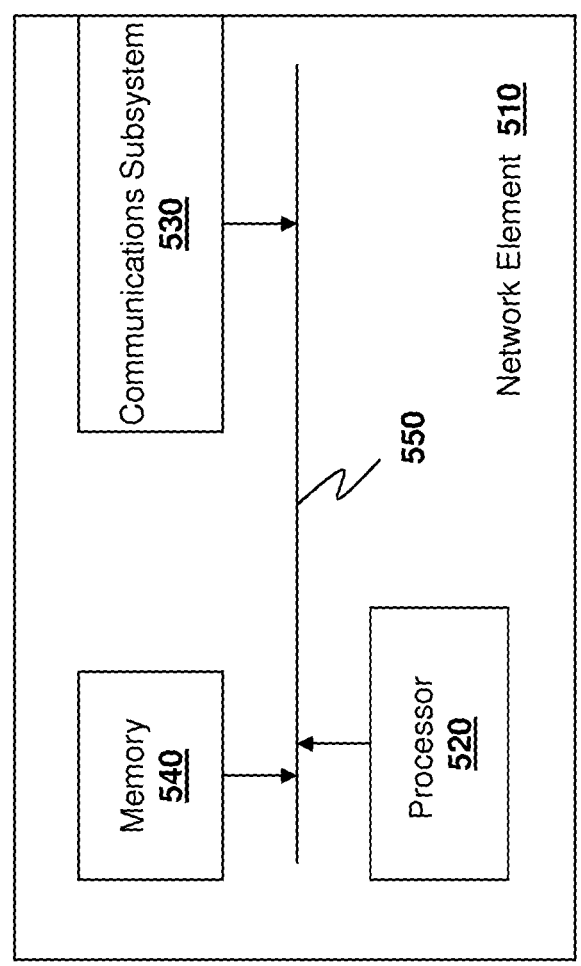
FIG. 5 is a simplified block diagram of an example network element.

In FIG. 5, network element 510 includes a processor 520 and a communications subsystem 530, where the processor 520 and communications subsystem 530 cooperate to perform the methods of the embodiments described above.

In particular, network element 510 may be any computer or server, and can include, for example, a network based server, a personal computer, a combination of servers, among others.

Processor 520 is configured to execute programmable logic, which may be stored, along with data, on network element 510, and shown in the example of FIG. 5 as memory 540. Memory 540 can be any tangible storage medium.

Alternatively, or in addition to memory 540, network element 510 may access data or programmable logic from an external storage medium, for example through communications subsystem 530.

Communications subsystem 530 allows network element 510 to communicate with other network elements. Examples of protocols for communication subsystem 530 include Ethernet, WiFi, cellular, WiLAN, among others.

Communications between the various elements of network element 510 may be through an internal bus 550 in one embodiment. However, other forms of communication are possible.

Further, a computing device for which the applications are intended can be any computing device as is known in the art, including, but not limited to, a personal computer, a laptop computer, a tablet, a smartphone or other data enabled cellular phone or device, among others. One example mobile device is described below with regard to FIG. 6.

Mobile device 600 may be a two-way wireless communication device having data communication capabilities and possibly voice communication capabilities. Mobile device 600 generally has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, a wireless device, a mobile device, or a data communication device, as examples.

Where mobile device 600 is enabled for two-way communication, it may incorporate a communication subsystem 611, including both a receiver 612 and a transmitter 614, as well as associated components such as one or more antenna elements 616 and 618, local oscillators (LOs) 613, and a processing module such as a digital signal processor (DSP) 620. As will be apparent to those skilled in the field of communications, the particular design of the communication subsystem 611 will be dependent upon the communication network in which the device is intended to operate. The radio frequency front end of communication subsystem 611 can be any of the embodiments described above.

Network access requirements will also vary depending upon the type of network 619. In some networks network access is associated with a subscriber or user of mobile device 600. A mobile device may require a removable user identity module (RUIM) or a subscriber identity module (SIM) card in order to operate on a network. The SIM/RUIM interface 644 is normally similar to a card-slot into which a SIM/RUIM card can be inserted and ejected. The SIM/RUIM card can have memory and hold many key configurations 651, and other information 653 such as identification, and subscriber related information.

Figure 6:
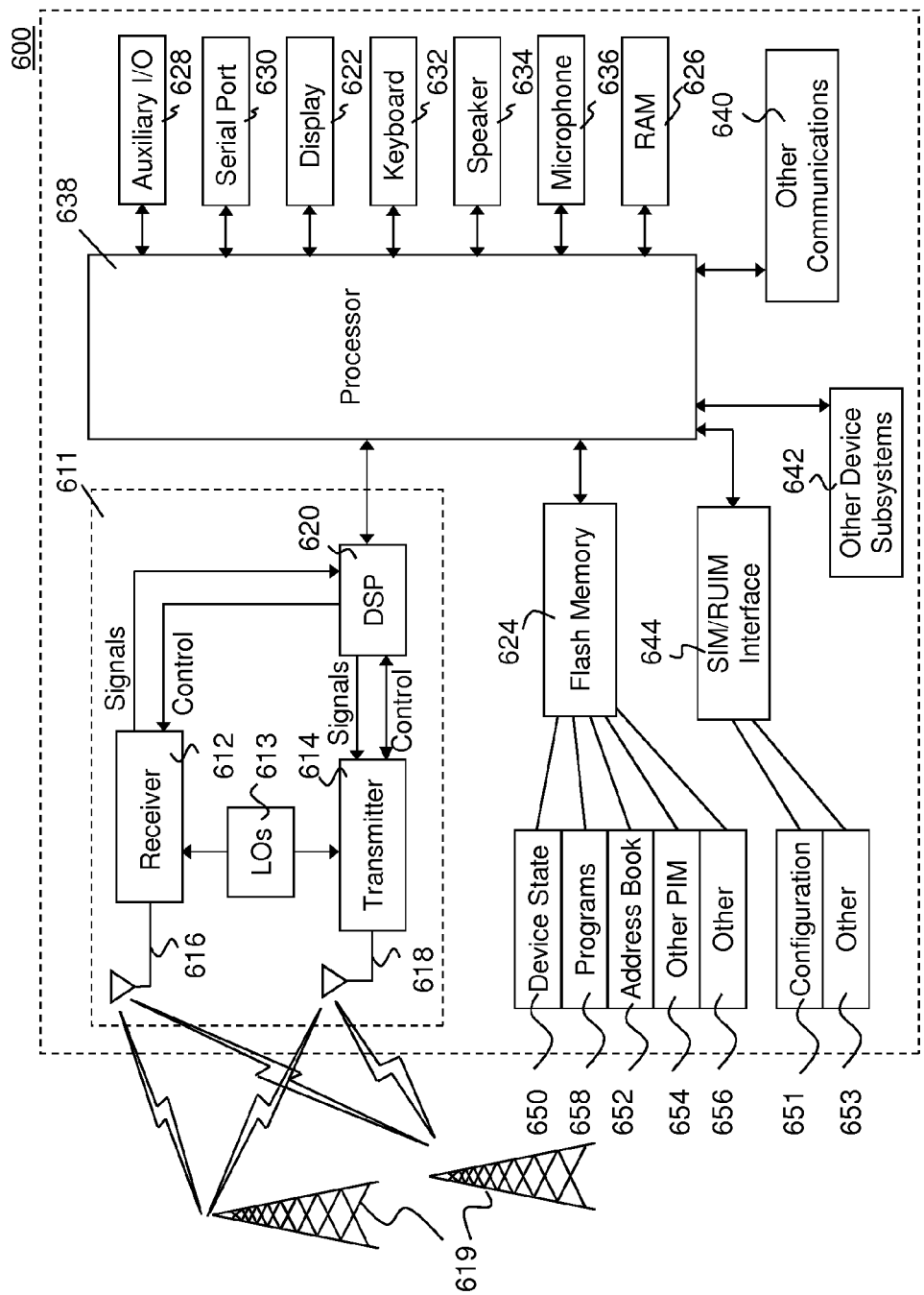
FIG. 6 is a block diagram of an example user equipment.

When required network registration or activation procedures have been completed, mobile device 600 may send and receive communication signals over the network 619. As illustrated in FIG. 6, network 619 can consist of multiple base stations communicating with the mobile device.

Signals received by antenna 616 through communication network 619 are input to receiver 612, which may perform such common receiver functions as signal amplification, frequency down conversion, filtering, channel selection and the like. A/D conversion of a received signal allows more complex communication functions such as demodulation and decoding to be performed in the DSP 620. In a similar manner, signals to be transmitted are processed, including modulation and encoding for example, by DSP 620 and input to transmitter 614 for digital to analog conversion, frequency up conversion, filtering, amplification and transmission over the communication network 619 via antenna 618. DSP 620 not only processes communication signals, but also provides for receiver and transmitter control. For example, the gains applied to communication signals in receiver 612 and transmitter 614 may be adaptively controlled through automatic gain control algorithms implemented in DSP 620.

Mobile device 600 generally includes a processor 638 which controls the overall operation of the device. Communication functions, including data and voice communications, are performed through communication subsystem 611. Processor 638 also interacts with further device subsystems such as the display 622, flash memory 624, random access memory (RAM) 626, auxiliary input/output (I/O) subsystems 628, serial port 630, one or more keyboards or keypads 632, speaker 634, microphone 636, other communication subsystem 640 such as a short-range communications subsystem and any other device subsystems generally designated as 642. Serial port 630 could include a USB port or other port known to those in the art.

Some of the subsystems shown in FIG. 6 perform communication-related functions, whereas other subsystems may provide "resident" or on-device functions. Notably, some subsystems, such as keyboard 632 and display 622, for example, may be used for both communication-related functions, such as entering a text message for transmission over a communication network, and device-resident functions such as a calculator or task list.

Operating system software used by the processor 638 may be stored in a persistent store such as flash memory 624, which may instead be a read-only memory (ROM) or similar storage element (not shown). Those skilled in the art will appreciate that the operating system, specific device applications, or parts thereof, may be temporarily loaded into a volatile memory such as RAM 626. Received communication signals may also be stored in RAM 626.

As shown, flash memory 624 can be segregated into different areas for both computer programs 658 and program data storage 650, 652, 654 and 656. These different storage types indicate that each program can allocate a portion of flash memory 624 for their own data storage requirements. Processor 638, in addition to its operating system functions, may enable execution of software applications on the mobile device. A predetermined set of applications that control basic operations, including at least data and voice communication applications for example, will normally be installed on mobile device 600 during manufacturing. Other applications could be installed subsequently or dynamically.

The processor 638, communications subsystem 611 and flash memory 624 can therefore support the methods as described in the present disclosure, and in particular in one embodiment can utilize a style sheet separate from the executable for the application for rendering a user interface for the application.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, calendar events, voice mails, appointments, and task items. Further applications may also be loaded onto the mobile device 600 through the network 619, an auxiliary I/O subsystem 628, serial port 630, short-range communications subsystem 640 or any other suitable subsystem 642, and installed by a user in the RAM 626 or a non-volatile store (not shown) for execution by the processor 638. Such flexibility in application installation increases the functionality of the device and may provide enhanced on-device functions, communication-related functions, or both. For example, secure communication applications may enable electronic commerce functions and other such financial transactions to be performed using the mobile device 600.

In a data communication mode, a received signal such as a text message or web page download will be processed by the communication subsystem 611 and input to the processor 638, which may further process the received signal for output to the display 622, or alternatively to an auxiliary I/O device 628.

A user of mobile device 600 may also compose data items such as email messages for example, using the keyboard 632, which may be a complete alphanumeric keyboard or telephone-type keypad, among others, in conjunction with the display 622 and possibly an auxiliary I/O device 628. Such composed items may then be transmitted over a communication network through the communication subsystem 611.

For voice communications, overall operation of mobile device 600 is similar, except that received signals would typically be output to a speaker 634 and signals for transmission would be generated by a microphone 636. Alternative voice or audio I/O subsystems, such as a voice message recording subsystem, may also be implemented on mobile device 600. Although voice or audio signal output is generally accomplished primarily through the speaker 634, display 622 may also be used to provide an indication of the identity of a calling party, the duration of a voice call, or other voice call related information for example.

Serial port 630 in FIG. 6 would normally be implemented in a personal digital assistant (PDA)-type mobile device for which synchronization with a user's desktop computer (not shown) may be desirable, but is an optional device component. Such a port 630 would enable a user to set preferences through an external device or software application and would extend the capabilities of mobile device 600 by providing for information or software downloads to mobile device 600 other than through a wireless communication network. The alternate download path may for example be used to load an encryption key onto the device through a direct and thus reliable and trusted connection to thereby enable secure device communication. As will be appreciated by those skilled in the art, serial port 630 can further be used to connect the mobile device to a computer to act as a modem or to a power source for charging.

Other communications subsystems 640, such as a short-range communications subsystem, is a further optional component which may provide for communication between mobile device 600 and different systems or devices, which need not necessarily be similar devices. For example, the subsystem 640 may include an infrared device and associated circuits and components or a Bluetooth™ communication module to provide for communication with similarly enabled systems and devices. Subsystem 640 may further include non-cellular communications such as WiFi or WiMAX.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

We claim:

1. A method, at a network element, for providing applications to a device having one of a plurality of device types, the method comprising:
   maintaining a plurality of user interface formatting specifications for an application;
   receiving a request for the application from the device, the request including an identifier associated with the device, the identifier identifying at least one of screen size and screen resolution;
   correlating one or more device display characteristics associated with the identifier with one of the plurality of user interface formatting specifications for the application, said correlating comprising:
      finding user interface formatting specifications which are compatible with a maximum number of said one or more device display characteristics; and
      determining a priority between user interface formatting specifications which are compatible with the identifier, the priority of each user interface formatting specification being pre-assigned;
   configuring the application with the one of the plurality of user interface formatting specifications, the configuring comprising combining the one of the plurality of user interface formatting specifications with an executable code portion for installation on the device; and
   sending the configured application to the device;
wherein the executable code portion is identical for each of the plurality of user interface formatting specifications.

2. The method of claim 1, wherein the user interface formatting specifications are in Cascading Style Sheet (CCS) syntax.

3. The method of claim 1, wherein the identifier identifies a model of a computing device.

4. The method of claim 1, wherein the application includes a user interface definition that is rendered at application execution time based on the user interface formatting specification.

5. An application repository server for providing applications to a device having one of a plurality of device types, the server comprising:
   a communications subsystem; and
   a processor;
   wherein the server is configured to:
      maintain a plurality of user interface formatting specifications for an application;
      receive a request for the application from a device, the request including an identifier associated with the device, the identifier identifying at least one of screen size and screen resolution;
      correlate one or more device display characteristics associated with the identifier with one of the plurality of user interface formatting specifications for the application, said correlating comprising:
         finding user interface formatting specifications which are compatible with a maximum number of said one or more device display characteristics; and
         determining a priority between user interface formatting specifications which are compatible with the identifier, the priority of each user interface formatting specification being pre-assigned;
      configure the application with the one of the plurality of user interface formatting specifications, the configuring comprises combining the one of the plurality of user interface formatting specifications with an executable code portion for installation on the device; and
      send the configured application to the device;
wherein the executable code portion is identical for each of the plurality of user interface formatting specifications.

6. The application repository server of claim 5, wherein the user interface formatting specifications are in Cascading Style Sheet (CCS) syntax.

7. The application repository server of claim 5, wherein the identifier identifies a model of a computing device.

8. The application repository server of claim 5, wherein the application includes a user interface definition that is rendered at application execution time based on the user interface formatting specification.

* * * * *